United States Patent

[15] 3,639,776

Fay et al.

[45] Feb. 1, 1972

[54] LITHIUM NIOBATE HARMONIC GENERATOR AND METHOD

[72] Inventors: Homer Fay; Wilbur J. Alford; Howard M. Dess, all of San Diego, Calif.

[73] Assignee: Union Carbide Corporation

[22] Filed: Aug. 7, 1968

[21] Appl. No.: 750,805

Related U.S. Application Data

[62] Division of Ser. No. 644,537, June 8, 1967, Pat. No. 3,528,765.

[52] U.S. Cl. ............................................307/88.3, 321/69 R
[51] Int. Cl. .......................................................H02m 3/00
[58] Field of Search..................330/4.5, 5; 307/88.3; 321/69

[56] References Cited

UNITED STATES PATENTS

| 3,262,058 | 7/1966 | Ballman et al. | 330/4.5 |
| 3,328,723 | 6/1967 | Giordmaine et al. | 330/4.5 |
| 3,528,765 | 9/1970 | Fay et al. | 330/4.5 |

OTHER PUBLICATIONS

Fay et al., " Applied Physics Letters," 1 Feb. 1968, pp. 89- 92
Bergman et al., " Applied Physics Letters," 1 Feb. 1968, pp. 92- 94
Bridenbaugh et al., " Applied Physics Letters," 1 Aug. 1970, pp. 104- 106

*Primary Examiner*—Roy Lake
*Assistant Examiner*—Darwin R. Hostetter
*Attorney*—Paul A. Rose, Thomas I. O'Brien, Harrie M. Humphreys and Leo A. Plum, Jr.

[57] ABSTRACT

This disclosure relates to an improved harmonic generator system utilizing a lithium niobate crystal having an elevated phase matching temperature. The system is especially suited for harmonic generation of visible coherent radiation from fundamental radiation of $1.06\mu$ wavelength. By reason of its higher phase matching temperature, the crystal can be used in the harmonic generator system at temperatures where a radiation caused optical damage does not affect the operation. A method for operating the lithium niobate harmonic generator system at the higher phase matching temperature of the crystal is also provided.

3 Claims, 4 Drawing Figures

PATENTED FEB 1 1972

INVENTORS
HOMER FAY
WILBUR J. ALFORD
HOWARD M. DESS

BY Leo A. Plum, Jr.
ATTORNEY

LITHIUM NIOBATE HARMONIC GENERATOR AND METHOD

BACKGROUND OF THE INVENTION

This application is a division of application Ser. No. 644,537, filed June 8, 1967 now U.S. Pat. No. 3,528,765, granted Sept. 15, 1970.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to the use of lithium niobate crystals having predeterminable birefringence and phase matching temperature properties in an apparatus utilizing such crystals as harmonic generators; and also includes the method of operation of such harmonic generators.

Coherent radiation in many frequencies is available from present day lasers. Strong coherent green light however is not readily available; for while the argon laser can produce radiation of this frequency, $53\mu$(microns) wavelength, the radiation is of low power and is present in the output of the argon laser along with radiation of other frequencies. It would be particularly useful to have a source of coherent green radiation because of its visibility, for example in applications such as target illumination, ranging and communications.

It is possible to produce coherent green radiation through the use of lithium niobate to double the frequency of a near infrared laser, such as a neodymium laser. For example, the neodymium doped yttrium aluminum garnet laser (Nd:YAG) produces a laser output at $106\mu$ wavelength. Lithium niobate has been shown to be a harmonic generating crystal, i.e., the crystal has the power to double the frequency of a light beam impinged upon it. Thus, if the $1.06\mu$ wavelength radiation of a (Nd:YAG) laser is passed through a lithium niobate crystal under proper conditions, a beam of bright, coherent green light at $0.53\mu$ wavelength is produced by the lithium niobate.

Lithium niobate is a very efficient harmonic generating crystal, converting a larger proportion of the energy falling upon it than other crystals. This crystal is additionally almost unique in permitting velocity matching of the fundamental and harmonic beams without double refraction. It has been found in practice, however, that second harmonic generation in lithium niobate is affected by certain factors which severely limit the power levels available and also increases the beam divergence. This problem involves a radiation "damage" in the crystal caused by visible second harmonic radiation of sufficient intensity. This damage appears as refractive index inhomogeneities which distort the harmonic beam and causes a greatly expanded beam divergence, and may also effect the harmonic generating process. Full use of lithium niobate as a harmonic generator cannot be presently achieved because of the limitations imposed by this damage problem.

It is a further object of this invention to provide an improved lithium niobate harmonic generator system and method for the operation thereof for efficient production of powerful coherent green light from the near infrared neodymium laser.

Other aims and objects of this invention will be apparent from the following description, the appended claims and the attached drawings.

SUMMARY OF THE INVENTION

According to the above objects, an improved harmonic generator system is provided which employs crystalline lithium niobate having the composition:

$$Li_2O_{(1-\gamma)} \cdot Nb_2O_5$$

wherein $\gamma$ is a positive number greater than 0 and less than about 0.01. This material can be produced by preparing a melt having a composition $(1+y)$ moles of $Li_2O$ per mole of $Nb_2O_5$, wherein $y$ is a number greater than 0 and up to about 0.3, and then forming a single crystal by cooling from said melt. More specifically, the material can be produced by forming a melt of the indicated compositions, bringing said melt to a temperature at which a crystal can form, inserting a lithium niobate seed crystal into said melt, and withdrawing said seed from the melt while allowing lithium niobate to crystallize on said seed and continuing said withdrawal to form a massive single crystal of lithium niobate.

The lithium niobate described above will generally be found to have a higher phase matching temperature than previously grown lithium niobate. The phase matching temperature is that temperature at which the fundamental radiation and the second harmonic radiation, which is one-half the wavelength of the fundamental, travel through the crystal with the same velocity. When this velocity matching condition is achieved, which requires that the extraordinary index of refraction for the harmonic radiation be equal to the ordinary index of refraction for the fundamental radiation, the harmonic radiation will be generated for the full length of the propagating path in the crystal and will have a maximum intensity. Lithium niobate crystals having higher phase matching temperatures, for example in excess of 100° C., are maintained at those elevated temperatures when operated as harmonic generators. Radiation caused damage does not effect the operation of the crystal as a harmonic generator at elevated temperatures as seriously as at lower temperatures. A system for efficiently producing second harmonic generation from fundamental radiation, particularly fundamental radiation having wavelength of $1.06\mu$, is provided comprising a neodymium laser capable of producing $1.06\mu$ wavelength radiation, and a lithium niobate crystal having a composition:

$$Li_2O_{(1-\gamma)} \cdot Nb_2O_5$$

wherein $\mu$ is a positive number greater than 0 and up to about 0.01.

The system described above is to be operated with the lithium niobate crystal maintained at a temperature T, the phase matching temperature of the crystal, which is determined by the composition of the crystal and the melt from which the crystal was grown. Accordingly, if the melt from which the crystal is grown has a composition $(1+y)$ moles of $Li_2O$ per mole of $Nb_2O_5$, then T, the phase matching temperature is determined from the following relationship:

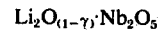

THE DRAWINGS

PREFERRED EMBODIMENTS

Figure 1:
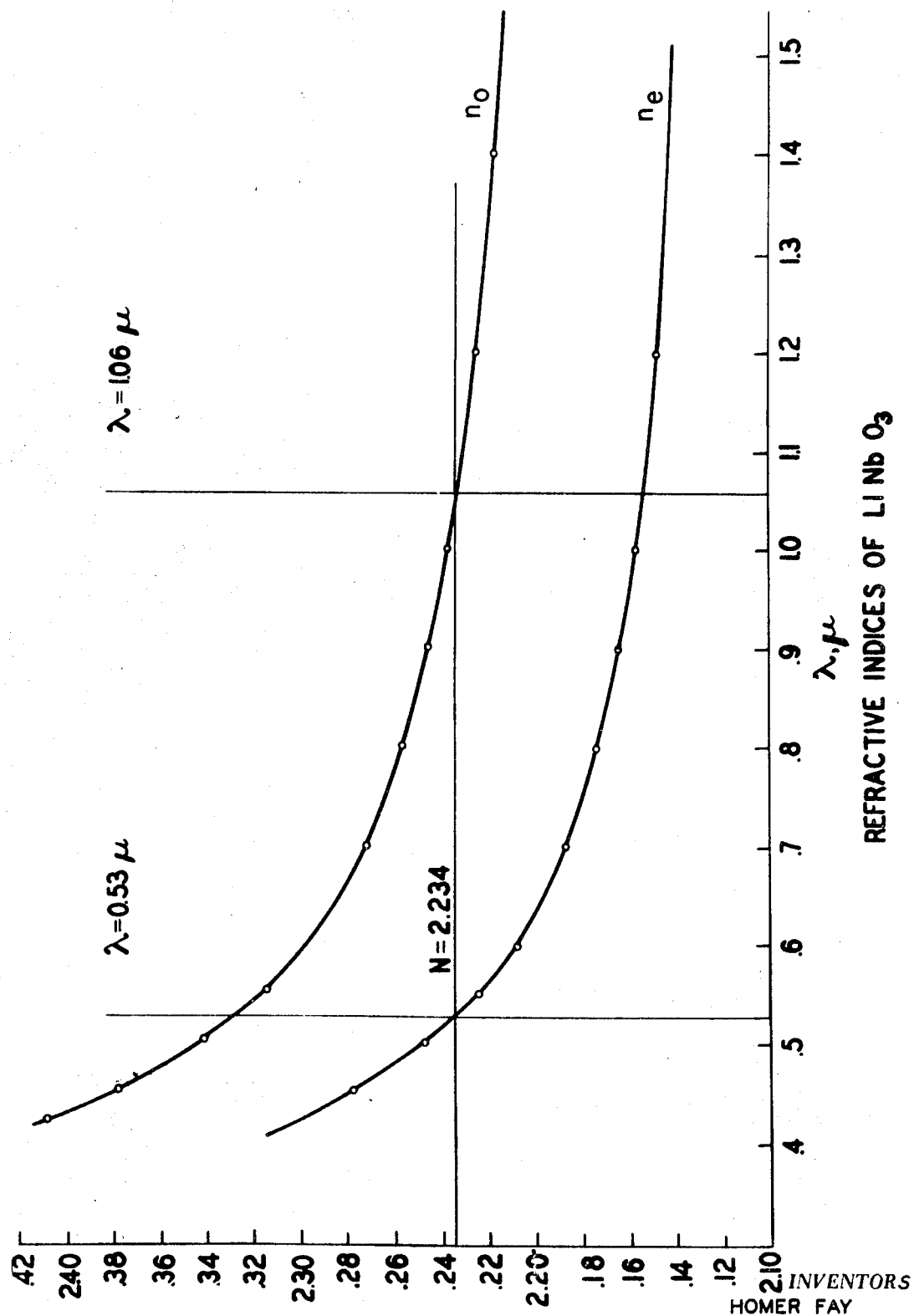
FIG. 1 is a plot showing the values of the refractive indices (N) of lithium niobate for radiation of varying wavelengths.

As seen in FIG. 1, the birefringent crystal lithium niobate has values of its ordinary index of refraction $n_o$ and its extraordinary index of refraction $n_e$ such that for a fundamental radiation of wavelength 106, a second harmonic radiation of wavelength $0.53\mu$ may be produced. In addition to the $1.06\mu$ wavelength radiation, the output of a neodymium laser fundamental radiation having wavelengths in the range of 0.9 to $1.2\mu$ are also of interest, and more specifically, the wavelength range of 1.0 to $1.15\mu$.

For the practical generation of harmonics, the phase matching condition must be met, i.e., the ordinary index of refraction for the fundamental radiation wavelengths must be equal to the extraordinary index of refraction for the second harmonic radiation wavelength so that the fundamental and harmonic radiation will travel through the crystal with the same velocity. This velocity or phase matching condition is temperature dependent since changes in temperature change the value of the extraordinary index of refraction, thereby changing the birefringence or difference in ordinary and extraordinary indices of refraction for any given wavelength. Phase matching of specific fundamental radiation, e.g., $1.06\mu$ radiation and the second harmonic thereof $0.53\mu$ radiation, can be achieved in lithium niobate only when the crystal is maintained at a temperature corresponding to its phase matching temperature for that wavelength of fundamental radiation. Actually, phase matching can be achieved throughout a range of phase matching temperatures by varying the angular relationship of the crystal's optic or $c$-axis with the direction of the beam of fundamental radiation. It is preferred to have the crystal oriented with its $x$-axis normal to the direction of the beam of fundamental radiation so that the fundamental and harmonic radiation will travel in the same direction. However, the crystal may be oriented at other angles of the $c$-axis to the direction of the fundamental beam than 90°. The phase matching temperature will have its maximum value when the crystal is arranged with its $c$-axis normal to the direction of fundamental radiation. The term phase matching temperature as used herein is meant to define that temperature range in which the fundamental radiation and the second harmonic radiation travel at the same velocity within the crystal when the fundamental beam propagates in a direction at or near a direction normal to the $c$-axis of the crystal. The symbol T is meant to indicate the highest temperature at which these velocity matching conditions can be met with a propagation of the fundamental beam in a direction exactly normal to the $c$-axis of the crystal whereby double refraction effects are absent.

The phase matching temperature of prior art lithium niobate crystals for fundamental radiation of $1.06\mu$ wavelength has been found to vary, and is generally about 60° C. When prior art lithium niobate crystals are utilized with neodymium lasers as harmonic generators, the crystal must be maintained at its phase matching temperature, for example, about 60° C. As previously indicated the prior art lithium niobate is subject to radiation caused damage when any significant power level is reached.

Figure 2:
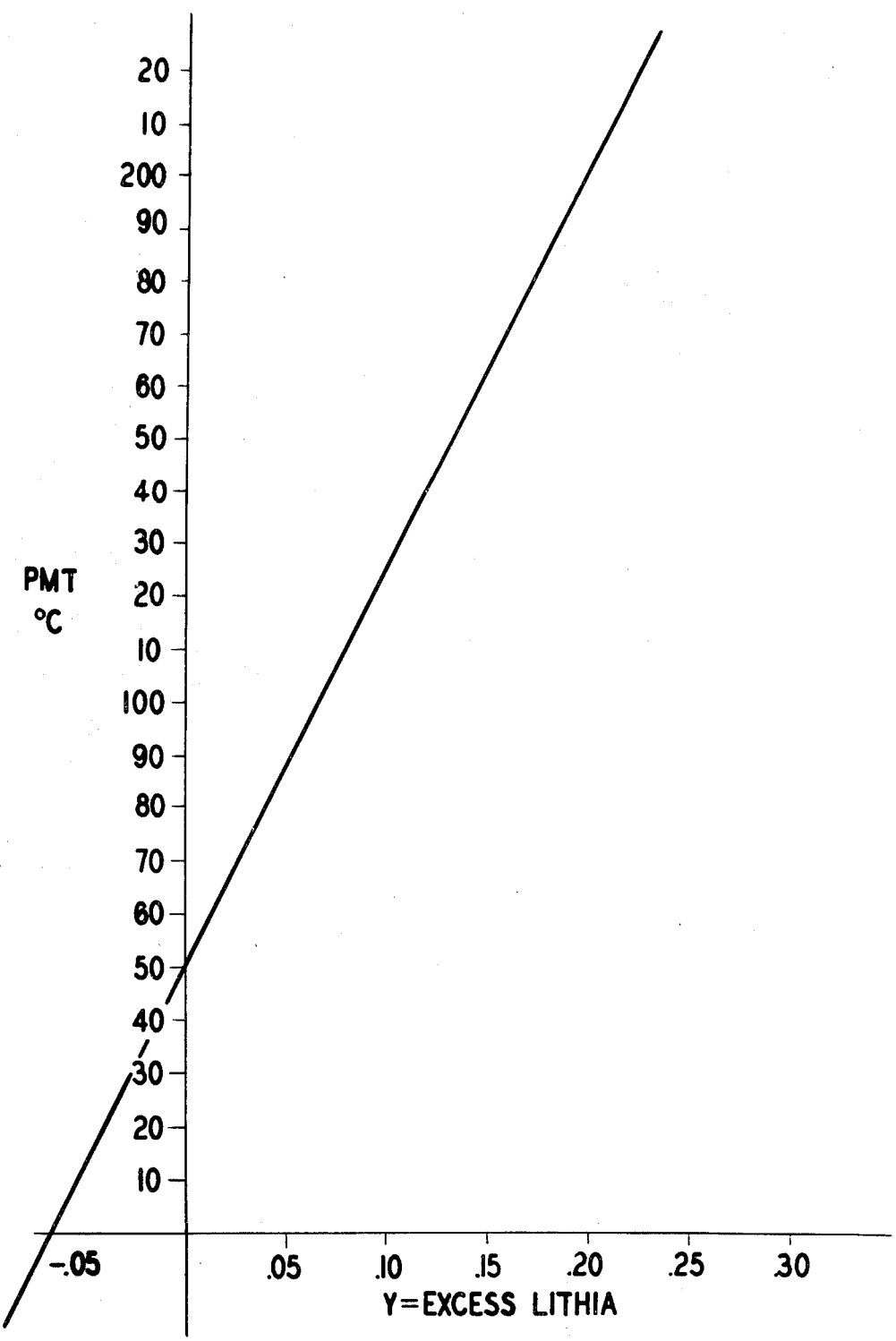
FIG. 2 is a plot showing the relationship of phase matching temperature (PMT) of lithium niobate crystals grown from melts having the indicated fractional excess (y) of moles of lithia.

The crystals described herein can be made to have higher phase matching temperatures and so may be operated as harmonic generators at higher temperatures in a region where radiation caused damage does not affect the crystal. Lithium niobate crystals can be produced according to the above-described process with various phase matching temperatures, for example, with phase matching temperatures in excess of 100° C. and more specifically, with a phase matching temperature of 186° C. FIG. 2 shows a plot of phase matching temperatures of lithium niobate crystals grown by pulling a crystal from a melt having an excess ($y$) of lithia in the melt over the stoichiometric composition of lithium niobate (1 mole lithia per mole of niobium pentoxide).

Although it is not intended that the invention herein be limited by the following explanation of the mechanism of this invention, it is believed that the prior art crystals, while commonly designated by the formula $LiNbO_3$ and assumed to be stoichiometric materials, are in fact accurately represented by the following relationship:

$$Li_2O_{(1-\gamma)} \cdot Nb_2O_5$$

wherein $\gamma$ represents deficiencies of lithia and ions in the crystal lattice and is a number generally greater than 0.01. According to the crystal growing process described previously, crystals having at least a lesser number of such lithium deficiencies are produced by solidifying a crystal from a melt in which is present an excess of $Li_2O$ over the stoichiometric amount of lithia thought to be required. The crystals so produced have phase matching temperatures in excess of those normally found for crystals grown from stoichiometric melts. In addition, it has been found that the phase matching temperature of crystals grown using this process are predictable from and related to the amount of the excess lithia present in the melt from which the crystal is formed. Referring to FIG. 2, the phase matching temperature (T) of a lithium niobate crystal can be increased by increasing the amount of lithia ($1+y$) in the melt of $Li_2O$ and $Nb_2O_5$.

From the curve shown in FIG. 2, it is found that the amount of excess lithia required to yield a crystal having a desired phase matching temperature T (for a fundamental radiation of wavelength 1.06) can be calculated from the following relationship:

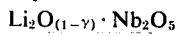

where $T$ is the phase matching temperature in °C.

It is believed that the addition of excess lithia to the melt causes the production of a lithium niobate crystal having an extraordinary index of refraction lower than that for a crystal grown from a stoichiometric melt. This lowering of the extraordinary index by increasing the lithia content of the melt causes the crystal to have a greater birefringence at normal temperatures. Such a crystal is no longer phase matching for the desired fundamental radiation at normal temperatures and will be phase matched and capable of operation as a harmonic generator only at the elevated temperature $T$.

Accordingly, lithium niobate crystals are now provided which are capable of operation as harmonic generators at elevated temperatures where crystal damage does not interfere with the operation. Using the process described above, crystals can be produced which have any desired phase matching temperature. More specifically, lithium niobate crystals can be provided having phase matching temperatures in excess of 100° C. including crystals having phase matching temperatures of about 186° C. Such crystals may be safely exposed to radiation of extremely high intensity without interference from crystal damage of the type previously described.

More specifically, these crystals can be employed as harmonic generators for fundamental radiation of $1.06\mu$ wavelength, the output of the neodymium lasers in general and specifically the Nd:YAG laser crystal. The combination of these crystals with a neodymium laser provides a highly desirable system having many uses.

Figure 3:
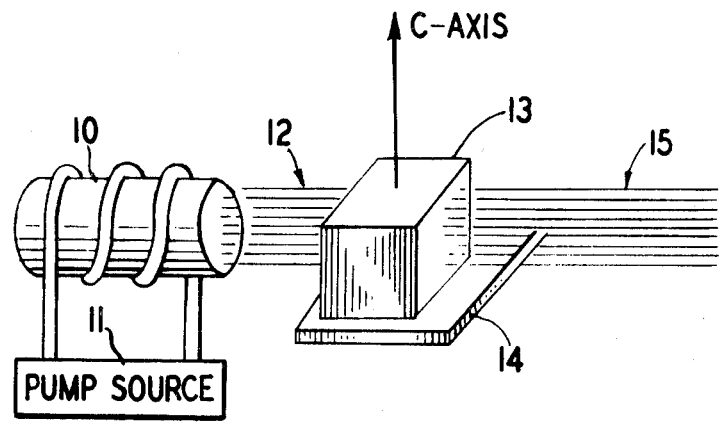
FIG. 3 is a schematic of an arrangement of a laser and a harmonic generating crystal.

A system for using the lithium niobate crystals of this invention as harmonic generators is shown schematically in FIG. 3. A laser crystal, for example, a Nd:YAG crystal 10 is shown with a pump source 11 and produces coherent radiation 12 at $1.06\mu$ wavelength. A lithium niobate crystal 13 is shown supported on a crystal holder 14 in the path of the laser output radiation 12 which passes through the lithium niobate crystal.

The crystal holder 14 may be of a type which allows angular adjustment of the lithium niobate crystal so as to vary the angle of the $c$-axis of the crystal to the direction of the beam of fundamental laser radiation 12. In the drawings, the crystal is represented with its $c$-axis vertical, i.e., normal to the direction of the laser beam.

The lithium niobate crystal has associated therewith a temperature controlling and sensing means which may be a part of the crystal holder 14 for maintaining the temperature of the lithium niobate at its phase matching temperature $T°$ C. The output radiation 15 from the lithium niobate will comprise green harmonic radiation at $0.53\mu$ wavelength and whatever portion of the laser output 12 which is not converted to second harmonic radiation. As suggested in the drawing, the harmonic radiation and the fundamental radiation will travel in the same direction on leaving the lithium niobate crystal since the crystal was arranged with its $c$-axis normal to the path of the fundamental radiation.

Figure 4:
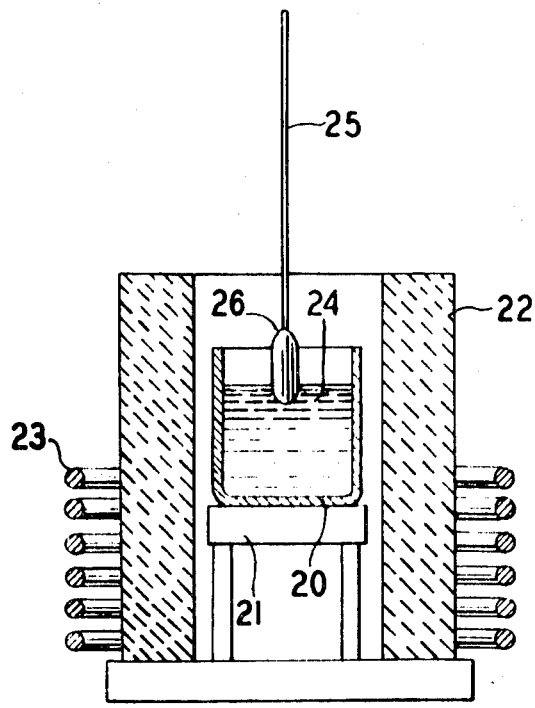
FIG. 4 is a diagrammatic view, in cross section, of a crystal growing apparatus suitable for producing lithium niobate crystals.

A crystal growing apparatus is shown in FIG. 4, comprising a crucible 20, preferably platinum, supported on a platform 21 and surrounded by insulation 22. A RF coil 23 is situated outside the insulating material 22 for inductively heating the metal crucible. The crucible holds a molten charge 24 of the compositions indicated herein. A seed crystal was supported on rod 25 and inserted into the melt 24 and then withdrawn to crystallize material on the seed and form the massive unicrystalline body 26 as shown. The rod 25 may be rotated as shown by the arrow during withdrawal. The seed crystal was cut and oriented on the rod 25 so that the crystal body 26 had its c-axis in a predetermined direction. A crystal body such as the harmonic generating crystal 13 of FIG. 3 is cut from the body 26. Generally, the crystal is cut as a parallel-piped with its c-axis parallel to an edge.

The following examples are presented to show the practice of this invention:

EXAMPLE I

A precharge mixture of 223.9 grams of lithium carbonate and 797.4 grams of niobium pentoxide was heated to about 1,000° C. to drive off the $CO_2$ and provide a sintered compact stoichiometric lithium niobate.

Two hundred and eighty five grams of this material was granulated and charged into the platinum crucible along with 3.55 grams of excess lithium carbonate (corresponding to a 5 percent by weight excess of lithia). This mixture was heated to its melting temperature of about 1,260° C. to form a melt having the following mole formula:

$$Li_2O_{(1.05)} \cdot Nb_2O_5$$

The melt temperature was raised to a temperature slightly above the M.P., e.g., about 1,275° C., and a properly oriented lithium niobate seed crystal was inserted into the melt. Crystallization of lithium niobate on the seed crystal was initiated and the seed crystal withdrawn at a rate of about 0.25 inches per hour with a rotation of about 30 r.p.m. to form a massive unicrystalline body of lithium niobate. It is generally preferred to grow the crystal with an oxidizing atmosphere maintained over the melt.

A cube measuring about 5 mm. on edge was fabricated from the rod grown above. This cube was supported in a crystal holder and placed in the path of a beam of Nd:YAG laser output radiation (1.06µ wavelength). The temperature of the crystal was raised until an output of frequency doubled radiation (0.53µ wavelength) in the form of green light was observed. This temperatures, 91° C. was the phase matching temperature of the crystal. As previously noted, the phase matching temperature of a birefringent crystal can be made to vary by changing the angular relationship between the incident fundamental radiation beam and the c-axis of the crystal. In the above test, 91° C. was the phase matching temperature for the crystal oriented with its optic or c-axis exactly normal to the direction of the incident light. As the angular relationship was adjusted from 90° to values less than 90°, the phase matching temperature was seen to decrease from a temperature of 91° C. Since it is generally desired to operate the crystal as a harmonic generator at the higher temperature, the crystal would generally be oriented with its c-axis vertical and maintained at the peak temperature of 91° C.

The crystal described above was tested for radiation damage and was found to undergo less damage from high intensity radiation than the prior art crystals which had lower phase matching temperatures and which accordingly were operated as harmonic generators at temperatures lower than 91° C.

EXAMPLE II

In another example, a lithium niobate crystal having a phase matching temperature of 186° C. was grown as follows: 285 grams of the presintered stoichiometric mixture described previously and 14.6 grams of lithium carbonate were charged into a platinum crucible and heated to drive off the $CO_2$ and form a melt having an excess of lithia over the stoichiometric lithia of 20 by weight and the following mole formula:

$$Li_2O_{(1.20)} \cdot Nb_2O_5$$

This melt was brought to a temperature about 15° C. over its melting point and after inserting a seed crystal, a massive crystal of lithium niobate was pulled from the melt as previously described.

A cube about 5 mm. on edge was fabricated from this rod. This cube was then supported in a crystal holder as shown in FIG. 3 and placed in the beam of 1.06µ wavelength radiation produced by the Nd:YAG laser. The temperature of the crystal was raised until generation of green light (having 0.53µ wavelength) was first observed. Such harmonic generation was not observed until this crystal was heated to a temperature of about 186° C. The crystal was arranged with its c-axis normal to the incident laser beam and the 0.53µ wavelength harmonic radiation was observed to have a propagating path substantially concentric with the infrared laser output radiation.

The crystal was not damaged; its frequency doubled radiation was not distorted or diminished as could be the case if a prior art lithium niobate crystal had been utilized as a harmonic generator at the lower temperatures dictated by its lesser phase matching temperature.

What is claimed is:

1. A system for efficiently producing second harmonic generation from fundamental radiation of 1.06µ wavelength comprising a neodymium-doped yttrium aluminum garnet laser system capable of producing coherent 1.06µ wavelength radiation, a lithium niobate crystal situated in the path of the laser radiation, said crystal grown by solidification from a melt containing $(1+y)$ moles of $Li_2O$ per mole of $Nb_2O_5$, wherein $y$ is determined by the following relationship:

$$y = 1.32 \times 10^{-3}T - 0.064$$

where $T$ is the phase matching temperature of the crystal in °C and is at least 170° C. and a crystal temperature controlling means for maintaining the temperature of the crystal at $T$° C.

2. A method of operating a lithium niobate crystal for generation of second harmonic radiation from fundamental radiation having a wavelength of 1.06µ while maintaining said crystal at an elevated temperature $T$ of at least 170° C. at which radiation-caused internal damage to the crystal does not effect the operation of the crystal, comprising providing a crystal which is phase matched for fundamental radiation of 1.06µ wavelength at said temperature $T$ by growing said crystal by solidification from a melt having a composition containing $(1+y)$ moles of $Li_2O$ per mole of $Nb_2O_5$, wherein $y$ is determined by the following relationship:

$$y = 1.32 \times 10^{-3}T - 0.064$$

and operating said crystal as a harmonic generator at said temperature of $T$° C.

3. The method of claim 2 in which $T$ is at least 186° C.

* * * * *